H. K. SMITH.
AUTOMOBILE SIGNAL.
APPLICATION FILED MAY 16, 1917.
1,315,168.
Patented Sept. 2, 1919.
2 SHEETS—SHEET 2.
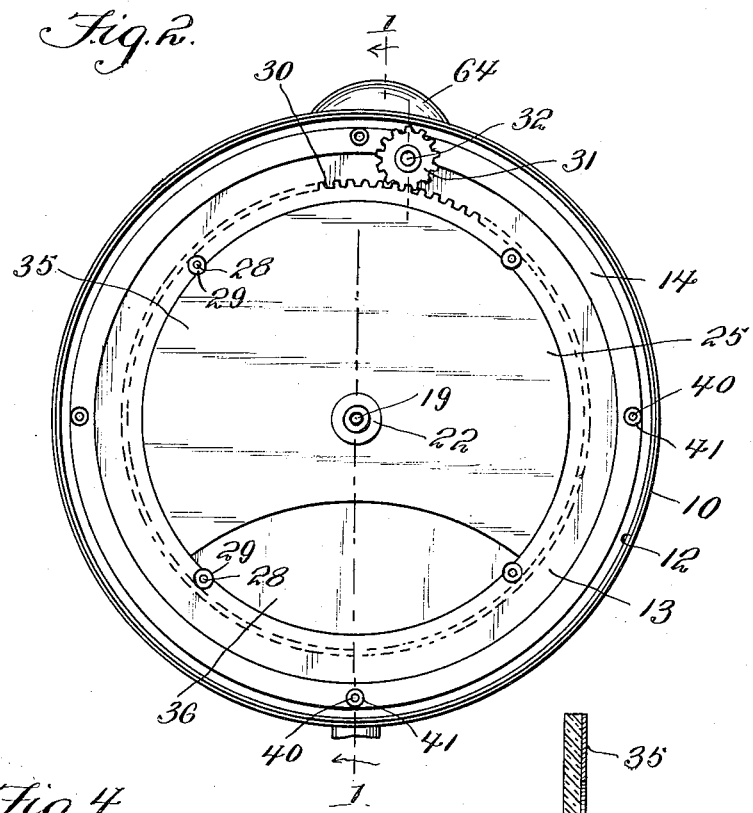
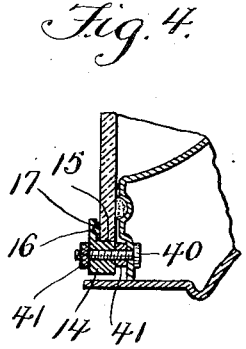
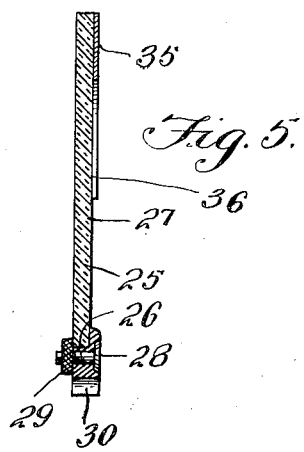
WITNESSES
INVENTOR
Hampton K. Smith
BY Victor J. Evans
ATTORNEY

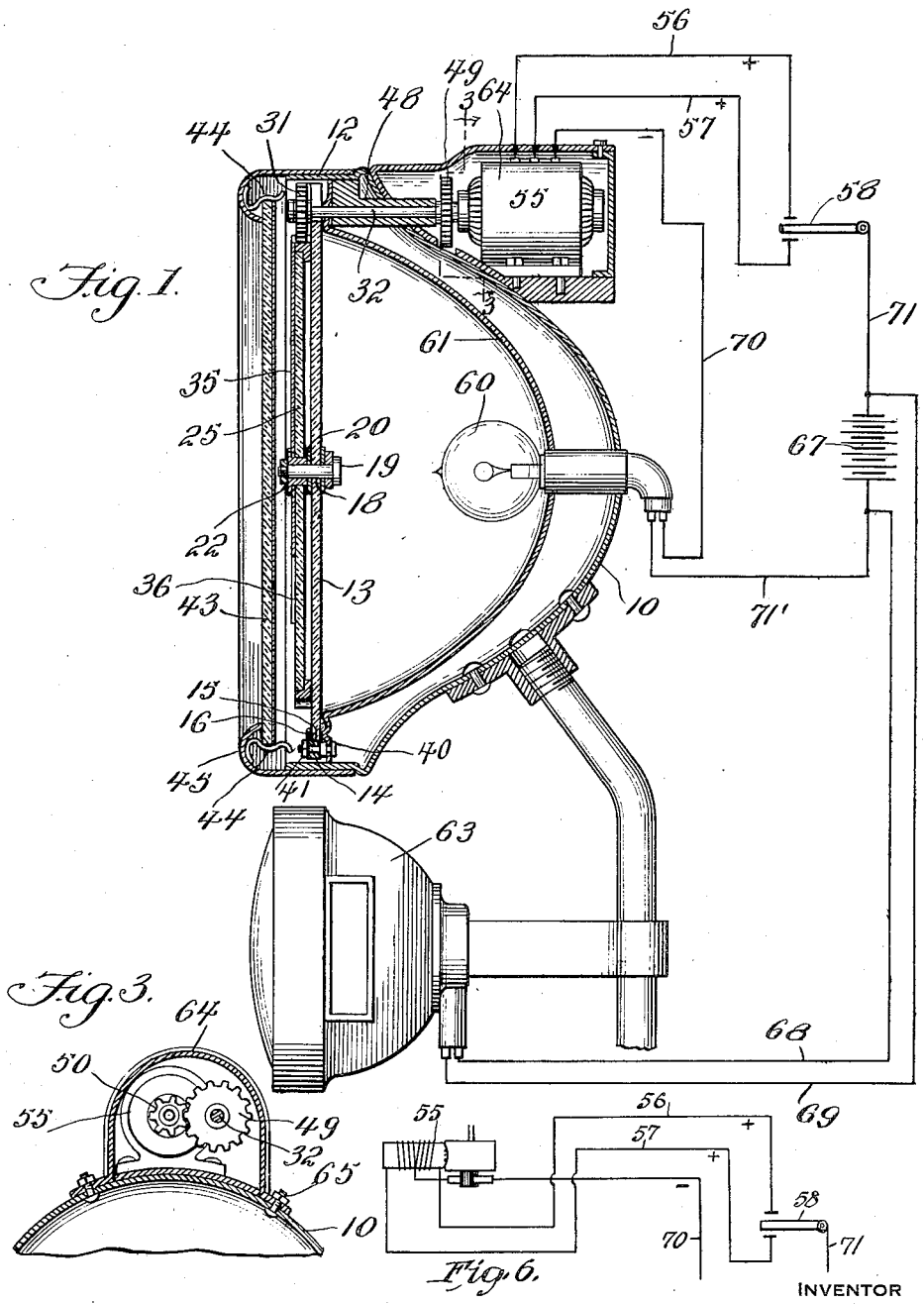

UNITED STATES PATENT OFFICE.

HAMPTON K. SMITH, OF UNION, SOUTH CAROLINA, ASSIGNOR OF FORTY PER CENT. TO HAROLD C. SMITH AND SIXTY PER CENT. TO EDITH K. SMITH, BOTH OF UNION, SOUTH CAROLINA.

AUTOMOBILE-SIGNAL.

1,315,168.   Specification of Letters Patent.   Patented Sept. 2, 1919.

Application filed May 16, 1917. Serial No. 169,027.

*To all whom it may concern:*

Be it known that I, HAMPTON K. SMITH, a citizen of the United States, residing at Union, in the county of Union and State of South Carolina, have invented new and useful Improvements in Automobile-Signals, of which the following is a specification.

This invention relates to automobile signals and the object is to provide a caution or danger signal to be employed as a tail lamp and designed to indicate the direction of intended travel of the operator of the car.

A further object is to provide in connection with a danger signal, or red light, an illuminated signal for indicating the direction of intended travel, in order that the driver of a car following the one carrying the signal herein described may know whether it is the intention of the operator of the first car to turn to the right or to the left.

A further object is to provide an electrically illuminated signal, with electrically driven means designed to impart a continuous rotary movement to the signal when in operation, the direction of movement indicating the direction of intended travel, or the direction in which the operator of the car desires to turn from the direct line of travel.

A still further object is to provide an electrically operated rotary signaling device in which the rays from the lamp are projected through a signaling member adapted for rotation in opposite directions, that is to the right or to the left—and preferably provided with a screen or the like showing green in order to indicate caution, this signal being employed in addition to the usual red lamp used as a tail light for automobiles or other vehicles.

With the foregoing and other objects in view, the invention consists in the novel construction, combination and arrangement of elements hereinafter described and claimed.

In the accompanying drawings:

Figure 1 is a view partly in vertical section and partly in elevation, the section being on the line 1—1 of Fig. 2;

Fig. 2 is a face view with the frame carrying the outer glass removed;

Fig. 3 is a section on line 3—3 of Fig. 1;

Fig. 4 is a detail view in section showing certain securing devices; and

Fig. 5 is a further detail of construction described below;

Fig. 6 is a diagrammatic view showing the manner in which the motor of Fig. 1 is reversed.

Referring to the drawings in detail, the casing of the lamp is designated 10, this casing being of substantially the form employed in a standard commercial type of lamp but having a flanged portion 12 of somewhat greater extent than that usually employed in said lamp for the purpose of permitting of the mounting of the operative elements of the device.

Within the flanged portion 12 I mount an annular member 14 having a cut-away portion 15 therein for the purpose of receiving the lens or glass 13 usually employed. This glass is held out of direct contact with the surface of the ring by means of a cushioning member such as a cord 16 countersunk within the groove 17.

The lens is provided with a central aperture 18 within which is mounted a pin 19 for carrying the rotary member of the signal device. A washer 20 serves to space said rotary member from the lens 13, and a flanged sleeve 22 is carried by the pin and directly supports the rotary member. The flanged sleeve is retained by a threaded tap or nut coöperating with a threaded portion of the pin 19.

The rotary signal member is designated 25 and includes a ring provided with an annular recess designated 26 accommodating a glass plate or lens 27 which is secured by means of screws or the like 28 engaged by taps 29. The outer edge of the ring 25 is provided with a series of teeth 30 and constitutes a gear wheel, this gear wheel coöperating with a pinion 31 carried by the shaft 32 driven by the motor for placing the signal in operation.

The member 27 may comprise a continuous plate of transparent glass, the major portion of which is screened as indicated at 35 and the minor portion of which remains transparent as indicated at 36. The color of the screen would usually be green in order to indicate caution, but red or any other color may be used if desired.

Instead of employing a member 27 of one piece of glass and providing a screen as described, it is obvious that the screen proper may be formed of colored glass cut to substantially the form shown in the drawings, that portion 36 being of clear glass as before, but in a separate piece. The rotation of the signal member will produce a "circle of light," the rays showing white, whereas the rays passing through the colored portion of the screen will show green.

The inner glass or lens 13 is held in position by means of securing devices 40 having threaded ends passing through a portion of the casing and being secured by taps 41. The outer lens of frosted glass is designated 43 and is secured by means of any suitable engaging devices 44 within a flanged ring 45 which is mounted on the flanged portion 12 of the casing.

The shaft 32 carries a pinion 31 as before stated, this pinion driving the gear wheel 30. The shaft 32 has its bearing in a sleeve 48 mounted horizontally within the casing of the lamp. This shaft carries a gear wheel 49 meshing with a pinion 50 carried by the shaft of the motor, the gear wheel and pinion being properly proportioned. The motor is designated 55 and the feed wires therefor 56 and 57, the direction of rotation of the armature and its shaft being controlled by a suitable switch shown conventionally at 58. The operation of this switch in one direction produces the movement of the rotary member of the signal in one direction, say toward the left looking from the rear, in order to indicate that the operator intends to turn to the left. The operation of the switch in the opposite direction reverses the motor and produces the operation of the rotary member of the signal in the opposite direction—that is to the right, indicating travel in that direction. The illuminating device comprises an electric lamp 60, mounted in the usual manner and position, the reflector being designated 61.

Beneath the casing 10 of the lamp the usual danger signal 63 showing red will be mounted and the current therefor will be continuous, whereas the lamp before mentioned is illuminated only when the operator of the car desires to throw the signal into operation in the manner indicated.

A casing for the motor is designated 64 and is mounted on the main casing 10 by any suitable securing means as shown at 65.

Battery 67 supplies current to lamp 63 by means of the circuit 68, 69, the circuit for the lamp 60 being shown at 70, 71', and the circuit for the motor being completed through wires 56 or 57, as the case may be. The field of the motor 55 includes coils reversely wound, and either one of the coils is placed in circuit, through its connecting wire 56 or 57, by throwing switch 58 in the required direction. Other electrical connections may be employed in lieu of the above conventional showing, and the current may be otherwise supplied.

What is claimed is:

1. In a device of the class described, a casing, a signal member mounted therein, means for imparting a continuous rotary movement to the signal for an interval in the direction of intended travel, and means for reversing the direction of movement thereof.

2. In a device of the class described, a casing, a lamp mounted therein, a signal member transmitting clear rays and colored rays of light, and means for imparting a continuous rotary movement to the signal member for an interval in the direction of intended travel.

3. In a device of the class described, a casing, a lamp mounted therein, a signal member transmitting clear rays and colored rays of light, means for imparting a continuous rotary movement to the signal member for an interval in the direction of intended travel, and means for reversing the direction of rotation of the signal member.

4. In a device of the class described, a casing, a lamp mounted therein, a rotary signal device including an annular toothed member and adapted to transmit clear and colored rays of light, and means for rotating said member in either of two directions for indicating the direction of intended travel and continuously during the time occupied in changing the course of travel.

5. In a device of the class described, a casing, a lamp mounted therein, a transparent member mounted in the casing, a pin carried centrally by said member, a rotary signal device mounted on the pin, and means for imparting a continuous movement to the signal device in either direction and while the normal course of travel is being departed from.

6. In a device of the class described, a casing, a lamp mounted therein, an annular member mounted within the casing, a transparent member carried by the annular member, a pin carried by said member last named, a rotary signal device mounted on the pin, and means for imparting a continuous movement to the signal device in either direction during the interval in which the signal is in operation.

7. In a device of the class described, a casing, a lamp mounted therein, a transparent member mounted within the casing, a pin carried by said member, an annular member provided with gear teeth, a signal member mounted in the annular member, the major portion of the signal member being adapted to transmit colored rays of light and the minor portion to transmit uncolored rays, means for driving the signal member continuously for an interval, and means for reversing the direction of movement of said member last named.

8. In a device of the class described, a casing, a reflecting device mounted therein, a lamp, a flanged member carried by the casing and mounting means carried thereby for supporting a plate of glass or the like, means for supporting a transparent plate adjacent to the edge of the reflector, a pin carried by the plate last named, a rotary member provided with teeth on the edge thereof, said rotary member constituting a signal and being mounted on said pin, a pinion engaging the teeth of the rotary member, a shaft rigidly connected with the pinion, means for continuously driving the shaft and the aforesaid rotary member for imparting continuous movement to the signal during the time in which the vehicle is changing its course of travel.

In testimony whereof I affix my signature.

HAMPTON K. SMITH.